United States Patent Office 3,494,954
Patented Feb. 10, 1970

3,494,954
3,3-BIS(PHENYL)-2-(4-HYDROXYPHENYL)
ACRYLONITRILES
Robert Edward Allen, Walnut Creek, and Laszlo Ambrus,
Berkeley, Calif., assignors to Cutter Laboratories, Inc.,
Berkeley, Calif., a corporation of Delaware
No Drawing. Continuation-in-part of application Ser. No.
380,083, July 2, 1964. This application June 19, 1967,
Ser. No. 647,213
Int. Cl. C07c *121/74;* A61k *17/00*
U.S. Cl. 260—465                                    7 Claims

ABSTRACT OF THE DISCLOSURE 3,3 - bis(phenyl) - 2 - (4 - hydroxyphenyl)acrylonitrile and 3,3 - bis(substituted phenyl) - 2 - (4 - hydroxyphenyl) acrylonitriles are characterized by uterotrophic and gonadotrophic inhibitory activity; and also are intermediates in the preparation of other useful compounds.

CROSS-REFERENCES TO RELATED APPLICATIONS

This application is a continuation-in-part of patent application Ser. No. 380,083, filed July 2, 1964, now United States Patent No. 3,336,255.

DESCRIPTION OF THE INVENTION

The novel compounds of the present invention may be represented by the formula:

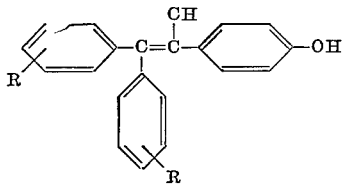

wherein R is selected from the group consisting of hydrogen, lower-alkyl, lower-alkoxy, halogen, trifluoromethyl, and dilower-alkylamino.

Throughout the specification and claims, the terms lower-alkyl, lower-alkoxy, and dilower-alkylamino refer to the respective groups having up to four carbon atoms inclusive in each lower-alkyl radical thereof. Such groups having up to a maximum of two carbon atoms in each lower-alkyl radical are preferred.

The compounds of the foregoing formula are characterized by gonadotrophic inhibitory and uterotrophic activity in unusual and desirable ratios, and are accordingly useful in the treatment of conditions involving fertility and sterility problems in both males or females, including those conditions arising from or subject to influence by female or male hormonal imbalance. The compounds are also useful as intermediates in the preparation of other useful compounds.

The hydroxy-containing triphenylacrylonitrile compounds may be conveniently prepared by demethylation of a corresponding methoxy-substituted triphenylacrylonitrile by means of pyridine hydrochloride, preferably at the reflux temperature for pyridine hydrochloride, or by decomposition of a 2-tetrahydropyranyl ether derivative of the phenol by means of an aqueous acid such as dilute hydrochloric or sulfuric acid or the like. The latter method is preferable, particularly when one desires to obtain a phenolic compound where another non-phenolic phenyl group carries an alkoxy substituent. The methyl or tetrahydropyranyl ether intermediates are conveniently prepared by the condensation of a suitably substituted benzophenone with an appropriately substituted phenylacetonitrile. The condensation may be effected in inert solvents such as diethylether, benzene, toluene, dimethylformamide, or any combination of these, preferably at their reflux temperatures, using a basic catalyst such as sodium or potassium or lithium amide, hydride, or the metals themselves in a finely divided state in a solvent such as toluene or xylene.

EXAMPLE 1

3,3-diphenyl-2-(4-hydroxyphenyl)acrylonitrile

One hundred ten grams (0.61 mole) of benzophenone and 40 grams (0.9 mole) of sodium hydride dispersion (53 percent in mineral oil) are suspended in 300 milliliters of dry benzene. To this stirred suspension, heated to reflux, is added a solution of 90 grams (0.61 mole) of 4-methoxyphenylacetonitrile in 200 milliliters of dry benzene over a one-hour period. The reaction mixture is refluxed four additional hours at the end of which time hydrogen evolution has practically ceased. The reaction mixture is kept at room temperature for sixteen hours and the excess hydride cautiously decomposed with water. The organic layer is washed several times with water, dried over anhydrous magnesium sulfate, filtered, and the solvent removed under reduced pressure. The residue is taken up in a minimum amount of hot ethanol. 3,3-diphenyl-2-(4-methoxyphenyl)acrylonitrile is obtained as yellow needles melting at about 148–149° C.

Ninety grams (0.29 mole) of 3,3-diphenyl-2-(4-methoxyphenyl)acrylonitrile and 126 grams (1.1 moles) of pyridine hydrochloride are refluxed for thirty minutes. The reaction mixture is cooled and diluted with water. The crude material is filtered and dissolved in one liter of five percent warm sodium hydroxide solution, the solution is filtered, and the filtrate is acidified with one liter of five percent hydrochloric acid. The precipitate is filtered and dissolved in a minimum amount of hot ethanol. 3,3-diphenyl-2-(4-hydroxyphenyl)acrylonitrile is obtained as yellow crystals melting at about 229–230° C.

*Analysis.*—Calculated for $C_{21}H_{15}NO$: C, 84.80; H, 5.08; N, 4.71. Found: C, 85.00; H, 4.61; N, 4.57.

This compound can also be obtained by acid decomposition of 3,3-diphenyl - 2 - [4 - (tetrahydropyran-2-yloxy) phenyl]acrylonitrile which is prepared by the condensation of benzophenone with 4-(tetrahydropyran-2-yloxy)phenylacetonitrile (procedure of Example 3) to give 3,3-diphenyl - 2 - [4 - (tetrahydropyran - 2 - yloxy)phenyl] acrylonitrile, melting at about 143–144° C.

*Analysis.*—Calculated for $C_{26}H_{23}NO_2$: C, 81.86; H, 6.08; N, 3.67. Found: C, 81.60; H, 6.08; N, 3.69.

EXAMPLE 2

2-(4-hydroxyphenyl)-3,3-bis(4-tolyl)acrylonitrile

By the procedure described in Example 1, 4,4'-dimethylbenzophenone is allowed to react with 4-methoxyphenylacetonitrile to give 2-(4-methoxyphenyl)-3,3-bis(4-tolyl) acrylonitrile, yellow crystals when crystallized from isopropanol, melting at about 146–148° C.

*Analysis.*—Calculated for $C_{24}H_{21}NO$: C, 84.95; H, 6.23; N, 4.12. Found: C, 84.52; H, 6.76; N, 3.91.

By treating 2-(4-methoxyphenyl)-3,3-bis(4-tolyl)acrylonitrile with pyridine hydrochloride according to the procedure of Example 1, 2-(4-hydroxyphenyl) - 3,3 - bis(4-tolyl)acrylonitrile is obtained as yellow crystals melting at about 229–230° C.

*Analysis.*—Calculated for $C_{23}H_{19}NO$: C, 84.90; H, 5.88; N, 4.31. Found: C, 84.74; H, 5.69; N, 4.70.

EXAMPLE 3

2-(4-hydroxyphenyl)-3,3-bis(4-methoxyphenyl)acrylonitrile

A mixture of 160 grams (1.2 moles) of 4-hydroxyphenylacetonitrile and 103 grams (1.3 moles) of dihydropyran is dissolved in 500 milliliters of dry benzene and two milliliters of concentrated hydrochloric acid added. The reaction mixture is refluxed for four hours and kept at room temperature for sixteen hours. The organic layer is washed several times with 200-milliliter portions of five percent sodium hydroxide solution and with water until neutral. The organic layer is dried over magnesium sulfate, filtered, and the solvent removed under reduced pressure. The oily residue is crystallized from an ether-pentane (1 to 3) mixture to give 4-(tetrahydropyran-2-yloxy)-phenylacetonitrile, yellow crystals melting at about 64–66° C.

To a refluxing suspension of 70 grams (1.8 moles) of sodium amide and 150 milliliters of benzene is added a solution of 154 grams (0.72 mole) of 4-(tetrahydropyran-2-yloxy)phenylacetonitrile in 500 milliliters of dry benzene over a three-hour period. The reaction mixture is refluxed for one additional hour at the end of which time the ammonia evolution has practically ceased. With stirring, a hot solution of 174 grams (0.72 mole) of 4,4'-dimethoxybenzophenone in two liters of benzene is added. After two additional hours at reflux, the reaction mixture is kept at room temperature for sixteen hours and the excess sodium amide is cautiously decomposed with water. The organic layer is washed several times with water, dried over anhydrous magnesium sulfate, filtered, and the solvent removed under reduced pressure. The oily residue is triturated with a warm mixture of one liter ethanol and 500 milliliters of petroleum ether (B.P. 60–68° C.) from which a yellow solid, melting at about 202–206° C., is obtained by evaporation. This solid is dissolved in 500 milliliters of boiling glacial acetic acid containing three drops of concentrated sulfuric acid and slowly diluted with water until yellow needles separate (about 800 milliliters of water is needed). 2-(4-hyroxyphenyl)-3,3-bis(4-methoxyphenyl)acrylonitrile is obtained as yellow crystals melting at about 217–219° C.

*Analysis.*—Calculated for $C_{23}H_{19}NO_3$: C, 77.29; H, 5.36; N, 3.92. Found: C, 77.38; H, 5.34; N, 3.81.

EXAMPLE 4

3,3-bis(4-chlorophenyl)-2-(4-hydroxyphenyl)acrylonitrile

By the procedure described in Example 3, 4,4'-dichloro-benzophenone is allowed to reaction with 4-(tetrahydropyran-2-yloxy)phenylacetonitrile to give, 3,3-bis(4-chlorophenyl)-2-(4-hydroxyphenyl)acrylonitrile, yellow crystals when crystallized from acetic from acetic acid, melting at about 252–254° C.

*Analysis.*—Calculated for $C_{21}H_{13}Cl_2NO$: C, 68.88; H, 3.58; N, 3.82. Found: C, 68.80; H, 3.58; N, 3.85.

EXAMPLE 5

3,3-bis(4-dimethylaminophenyl)-2-4-hydroxyphenyl)acrylonitrile

By the procedure described in Example 3, 4,4'-bis(dimethylamino)-benzophenone is allowed to react with 4-(tetrahydropyran-2-yloxy)phenyl-acetonitrile to give 3,3-bis(4 - dimethylaminophenyl) - 2-[4-(tetrahydropyran-2-yloxy)phenyl]acrylonitrile, yellow crystals when crystallized from dimethylformamide-ethanol (1:20), melting at about 189–191° C.

*Analysis.*—Calculated for $C_{30}H_{33}N_3O_2$: C, 77.05; H, 7.11; N, 8.99. Found: C, 76.82; H, 7.23; N, 8.88

The tetrahydropyranyl derivative dissolved in dimethylformamide is decomposed with excess 30 percent sulfuric acid and, upon neutralization with diethylamine, orange crystals of 3,3-bis(4-dimethylaminophenyl)-2-(4-hydroxyphenyl)acrylonitrile are obtained, melting at about 240–242° C.

*Analysis.*—Calculated for $C_{25}H_{25}N_3O$: C, 78.29; H, 6.57; N, 10.95. Found: C, 77.80; H, 6.76; N, 10.78.

EXAMPLE 6

2-(4-hydroxyphenyl)-3,3-bis(4-trifluoromethylphenyl)acrylonitrile

By the procedure described in Example 1, 4,4'-bis(trifluoromethyl)-benzophenone is allowed to react with 4-methoxyphenylacetonitrile to give 2-(4-methoxyphenyl)-3,3-bis(4-trifluoromethylphenyl)acrylonitrile.

By treating 2-(4-methoxyphenyl)-3,3-bis(4-trifluoromethylphenyl)acrylonitrile with pyridine hydrochloride according to the procedure of Example 1, 2-(4-hydroxyphenyl)-3,3-bis(4-trifluoromethyl)acrylonitrile is obtained.

Where the foregoing examples produce a compound having a methyl or other lower-alkyl group, it is to be understood that compounds containing other lower-alkyl groups of straight or branched nature and containing up to four carbon atoms inclusive, such as methyl, ethyl, propyl, isopropyl, butyl, sec.-butyl, and t.-butyl, are prepared in the same manner by substitution in the process of the appropriate different lower-alkyl starting material. Likewise, where chloro or other halogen atom is present, although chlorine is preferred, further halogen compounds including iodo, bromo, chloro, and fluoro compounds are prepared starting from the appropriate halogenated starting material. Similarly, where methoxy or other lower-alkoxy group is present, compounds having other lower-alkoxy groups containing various lower-alkyl groups having up to four carbon atoms inclusive are prepared in the same manner from the appropriate different lower-alkoxy starting material. Moreover, when one diloweralkylamino group, such as the dimethylamino group, is present in a compound, other dilower-alkylamino compounds are prepared in the same manner starting only with the selected different dilower-alkylamino compound. In the same manner, ortho and meta substituted compounds are produced instead of the para by utilizing the selected ortho or meta substituted starting compound. Similarly, other molecular changes are readily made.

The compounds of the invention are generally characterized by the phamacological activity hereinbefore stated, making them useful in counteracting certain physiological abnormalities in a living animal body. Effective quantities of the pharmacologically active compounds of the invention may be administered to a living animal body in any one of various ways, for example, orally as in capsules or tablets, parenterally in the form of sterile solutions, suspensions, or by pellet implantation, and in some cases intravenously in the form of sterile solutions. Other modes of administration are cutaneously, subcutaneously, buccally, intramuscularly, and intraperitoneally.

Pharmaceutical formulations are usually prepared from a predetermined quantity of one or more of the compounds of the invention, preferably in solid form. Such formulations may take the form of powders, elixirs, solutions, pills, capsules, pellets, or tablets, with or without, but preferably with, any one of a large variety of pharmaceutically acceptable vehicles or carriers. When in admixture with a pharmaceutical vehicle or carrier, the active ingredient usually comprises from about 0.01 to about 75 percent, normally from about 0.05 to about 15 percent, by weight of the composition. Carriers such as starch, sugar, talc, commonly used synthetic and natural gums, water, and the like, may be used in such formulations. Binders such as gelatin, and lubricants such as sodium stearate, may be used to form tablets. Disintegrating agents such as sodium bicarbonate may also be included in tablets.

Although relatively small quantities of the active materials of the invention, even as low as 0.1 milligram, may be used in cases of administration to subjects having a relatively low body weight, unit dosages are usually five milligrams or above the preferably twenty-five, fifty, or one-hundred milligrams or even higher, depending of course upon the subject treated and the particular result desired. Broader ranges appear to be one to 500 milligrams per unit dose. The active agents of the invention may be combined for administration with other pharmacologically active agents, such as analgesics, sedatives, tranquilizers, adrenal or progestational or estrogenic steroids or hormones, or the like, or with buffers, antacids or the like, and the proportion of the active agent or agents in the compositions may be varied widely. It is only necessary that the active ingredient of the invention constitute an effective amount, i.e., such that a suitable effective dosage will be obtained consistent with the dosage form employed. Obviously, several unit dosage forms may be administered at about the same time. The exact individual dosages as well as daily dosages in a particular case will of course be determined according to well-established principles.

It is to be understood that the invention is not to be limited to the exact details of operation or exact compounds, compositions, or procedures shown and described, as obvious modifications and equivalents will be apparent to one skilled in the art.

We claim:

1. A 3,3 - bis(phenyl) - 2 - (4 - hydroxyphenyl) acrylonitrile having the formula:

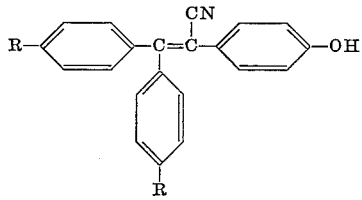

wherein both R are always the same, and wherein R is selected from the group consisting of hydrogen, lower-alkyl, lower-alkoxy, halogen, trifluoromethyl, and dilower-alkylamino.

2. 3,3 - diphenyl - 2 - (4 - hydroxyphenyl)acrylonitrile.
3. 3,3-bis(4 - methoxyphenyl) - 2 - (4-hydroxyphenyl) acrylonitrile.
4. 3,3 - bis(4 - dimethylaminophenyl) - 2-(4-hydroxyphenyl)acrylonitrile.
5. 3,3 - bis(4 - tolyl) - 2 - (4 - hydroxyphenyl)acrylonitrile.
6. 3,3-bis(4 - chlorophenyl) - 2 - (4-hydroxyphenyl) acrylonitrile.
7. 3,3 - bis(4 - trifluoromethylphenyl) - 2 - (4-hydroxyphenyl)acrylonitrile.

References Cited

UNITED STATES PATENTS

| | | | |
|---|---|---|---|
| 2,745,870 | 5/1956 | Rorig | 260—465 X |
| 2,768,210 | 10/1956 | Rorig | 260—465 X |
| 2,768,963 | 10/1956 | Rorig | 260—465 |
| 3,306,895 | 2/1967 | Roberts et al. | |
| 3,316,272 | 4/1967 | Roberts et al. | 260—465 X |
| 3,222,388 | 12/1965 | Perelman | 260—465 |
| 3,336,355 | 8/1967 | Allen et al. | 260—465 |

CHARLES B. PARKER, Primary Examiner

S. T. LAWRENCE III, Assistant Examiner

U.S. Cl. X.R.

260—345.9; 424—304

UNITED STATES PATENT OFFICE
CERTIFICATE OF CORRECTION

Patent No. 3,494,954                                    February 10, 1970

Robert Edward Allen et al.

It is certified that error appears in the above identified patent and that said Letters Patent are hereby corrected as shown below:

Column 1, line 26, "3,336,255" should read -- 3,336,355 --; lines 32 to 38, the formula should appear as shown below:

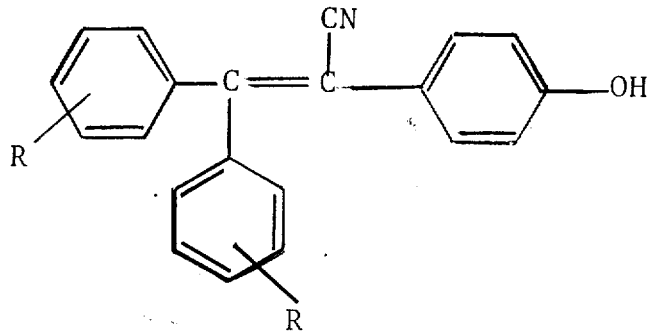

Column 3, line 47, "give," should read -- give --; line 49, cancel "from acetic", second occurrence; line 56, "-2-4-hydroxy-" should read -- -2-(4-hydroxy- --.

Signed and sealed this 16th day of March 1971.

(SEAL)
Attest:

EDWARD M. FLETCHER, JR.                            WILLIAM E. SCHUYLER, JR.
Attesting Officer                                            Commissioner of Patents